United States Patent
Brown

[11] 3,776,219
[45] Dec. 4, 1973

[54] CERVICAL SCRAPER

[75] Inventor: Paul A. Brown, Ridgewood, N.J.

[73] Assignee: Metpath Inc., Hackensack, N.J.

[22] Filed: Sept. 15, 1972

[21] Appl. No.: 289,674

[52] U.S. Cl. ................. 128/2 B, 128/304, 128/2 W
[51] Int. Cl. .......................................... A61b 10/00
[58] Field of Search .................. 128/2 R, 2 B, 2 W, 128/304

[56] References Cited
UNITED STATES PATENTS

| | | | |
|---|---|---|---|
| 2,767,703 | 10/1956 | Nieburgs | 128/2 B |
| 2,847,000 | 8/1958 | Nieburgs | 128/2 B |
| 2,905,169 | 9/1959 | Nieburgs | 128/2 B |
| 3,592,186 | 7/1971 | Oster | 128/2 B |
| 3,640,268 | 2/1972 | Davis | 128/2 B |
| 3,664,328 | 5/1972 | Moyle | 128/2 B |

*Primary Examiner*—Aldrich F. Medbery
*Attorney*—Hubert T. Mandeville et al.

[57] ABSTRACT

A cervical scraper unit is provided and particularly for utilization by the female herself for collecting a cytological sample, including endocervical and exocervical cells as well as exudate, from the vagina or cervix, which unit is arranged to protect the sample as it is withdrawn from the vagina, thus avoiding unnecessary exposure of the sample to contaminants. An improved method of making Pap smear slides is also disclosed herein. The unit comprises an insertion tube containing an elongated sample handle holding a generally conically shaped, rounded apex collector portion made of a soft, resilient, fluid-resistant, porous material, such as polyurethane foam, and having a plurality of flexible petal-like appendages which serve to protect the collector portion prior to and after the sample is obtained.

4 Claims, 4 Drawing Figures

PATENTED DEC 4 1973 3,776,219

CERVICAL SCRAPER

Generally speaking, this invention relates to methods and apparatus for obtaining a cervical cytological sample for subsequent testing of the sample by what is commonly referred to as the Pap test. More particularly, this invention relates to such methods and apparatus which enables the person undergoing testing to obtain the sample herself in a manner whereby no discomfort is realized and the sample is effectively protected from contamination prior to its transfer to a test slide.

In many instances, people living in remote areas do not have medical assistance readily available to them for long periods. Nevertheless, it has become common practice to require periodic routine testing of females in order to ascertain early indications of carcinoma of the cervix. Moreover, because of the usual discomforts and situations connected with such testing in the past, some women avoid utilizing the advantages of such early detection for periods substantially longer than is considered safe by the medical profession. This invention overcomes these difficulties by providing methods and apparatus for self-imposed testing for obtaining samples which can subsequently be sent for testing to the appropriate facilities.

As is well known in the medical profession, clinical anaylsis of the Papanicolaou smear is a very important method of detecting carcinoma of the cervix. Heretofore, the smear has been manually obtained by gynecologists using various sampling devices including a simple, cotton-tipped stick or a rigid, bare wooden scraper. In addition, cytological specimens have been collected by aspiration or irrigation. These techniques and instruments have not been totally acceptable in terms of completeness of sampling, comfort to the patient, and facility of use.

Accordingly, an object of the present invention is the provision of a new and improved cytological sampling device in the form of a new cervical scraper and an improved method which may be readily used by the person being tested, or a physician to provide a better sampling of the cervix by a full cell representation with minimum traumatic effect on the patient.

Another object of the present invention is the provision of such a scraper which reduces tissue damage during the sampling procedure and which provides for protection of the sample from contaminants during withdrawal.

Specifically, the essence of the subject invention is the improvement in the method of making Pap smear slides and, therefore, the improvement in the accuracy and reliability of physicians' diagnoses and in their detection of carcinoma. The more reliable and more accurate diagnoses attainable by the methods and apparatus of the present invention are attainable through the use of an improved instrument in the nature of a new cervical scraper which provides still further advantages to patient, physician and cytologist.

That is to say, the new instrument enables a patient, by herself, to obtain a more complete cervical sample than has heretofore been available, including both endocervical and exocervical cells as well as exudate, and enables the collected cervical matter to be more completely and safely transferred to a slide for subsequent diagnostic purposes by a cytologist than has heretofore been possible. Moreover, the new instrument is significantly less painful to the patient, is less traumatic in its application, and consequently, significantly reduces the risk of infection in the patient.

More specifically, the conventional method of obtaining Pap smears includes the use by a physician of rigid wooden or plastic sticks, essentially two-dimensional in cross section (a typical one of which is shown in U.S. Design Pat. No. D196,412) or by using cotton-covered probes or sticks. These wood probes are traumatic, often causing injury and consequent infection; they are not porous and do not collect exudate which is useful in indicating, in addition to cancer, the presence of infectious microorganisms such as trichomonads, monilia albicans, leptothrix, and numerous other bacterial organisms. Moreover, since they are rigid rather than soft and flexible, the wood sticks tend to destroy the friable, cervical cells when the probe is wiped against the rigid glass slide. In addition to destroying a portion of the sample, the use of a rigid probe tends to discharge the specimen non-uniformly onto the slide, making reading difficult and reducing the reliability of the subsequent tests thereof.

In accordance with the principles of the present invention, an improved scraper comprises a conical polyurethane foam head cantilevered at the end of a hollow plastic tube and enveloped by a plurality of protective flexible petal-like appendages. The head is mounted to be exposed by the "petals" at the testing site, and to accommodate its collapse and flexion when it is rotated in situ against the entrance to the cervix. Subsequently, the "petals" are arranged to envelop and protect the testing head during withdrawal. The employment of a cantilevered, conical polyurethane foam head as a cervical scraper is unique and provides numerous advantages, as well as eliminating the shortcomings of prior art scrapers. The scraper of the invention may be easily employed by an untrained woman without pain and without serious trauma to tissue at the sampling site in the collection of a full representation of cells, both endocervical and exocervical. Moreover, the foam also collects exudate to enable a more complete diagnosis of cervical and vaginal conditions to be made from the collected sample. The ability of the scraper to collapse and to flex, its resilient nature, and its conical shape, along with the protection of the sample by the "petals", all contribute to the efficacy and completeness of transfer of the full representation of collected matter to a slide for subsequent microscopic examination.

Before describing this invention in more detail, it may be well to note that the flexible petal-like appendages of this invention may be comprised of any well-known flexible materials which will be inert to the environment in which they are to be used and which can be readily sterilized in a pre-packaged form by conventional means, including gassing with ethylene oxide and propylene oxide, all in well known manner. Such materials include natural and synthetic rubbers and certain resins including polypropylene, polyethylene, polyester, latex impregnated paper and polyvinyl chloride. It should be understood that the materials will be selected depending upon the additives included in their formulations to provide soft, flexible surfaces in the environment in which they are used.

Accordingly, with the foregoing and other objects in view, this invention will be more particularly described, and other objects and advantages hereof will be apparent from the following description, the accompanying drawings, and the appended claims. In the Drawings:

Figure 1:
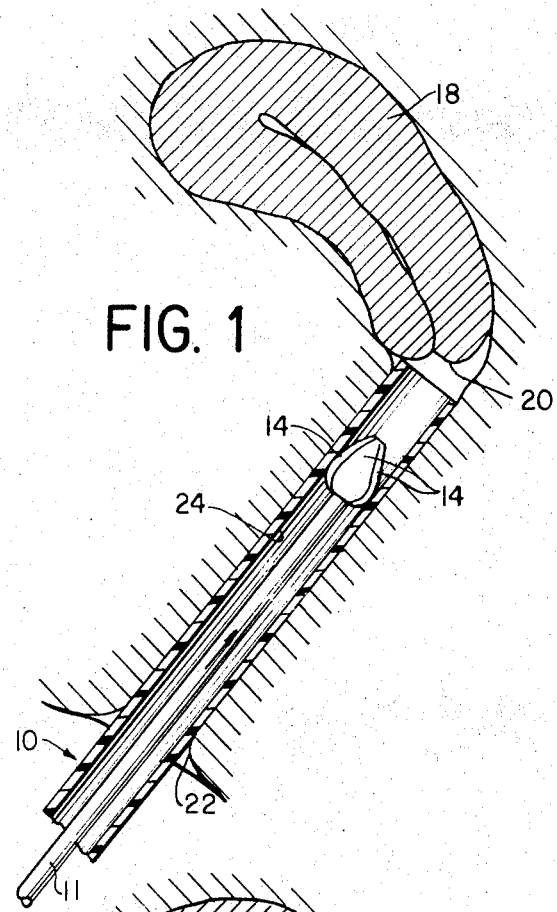
FIG. 1 is a schematic cross sectional view of a vaginal canal and uterus with the new scraper unit shown embodying and for practicing this invention during insertion thereof and prior to the opening of the petals.

Referring to the drawings in which like reference characters refer to like parts throughout the several views thereof, the new cervical scraper unit of the invention is shown generally at 10 comprised of a rigid, elongated rod-like support 11 to which a generally conical, synthetic sponge-like scraper head 12 (FIG. 2) is cantilevered. The head 12 is shown in FIG. 1 enclosed in a protective outer layer formed from a plurality of flexible petal-like appendages 14 fixed at one of their ends to the rod-like support end between it and the lead 12 as seen in FIG. 2.

The rod 11 may be a 0.25 inch O.D. hollow plastic tube, approximately 7 to 9 inches in over-all length. The scraper head 12 when exposed will be approximately 0.75–1.15 inches in length and approximately 0.75 inch in diameter at its base 15. The forward tip 17 of the scraper is generally convex in shape, thus giving the scraper the form of a truncated cone.

The head 12 may be attached to rod 11 in any appropriate manner, such as by providing a recess, not shown, in the bottom of the sponge-like collector head 12 for receiving the upper end of rod 11. Suitable adhesives may be utilized to maintain adherence.

Figure 2:
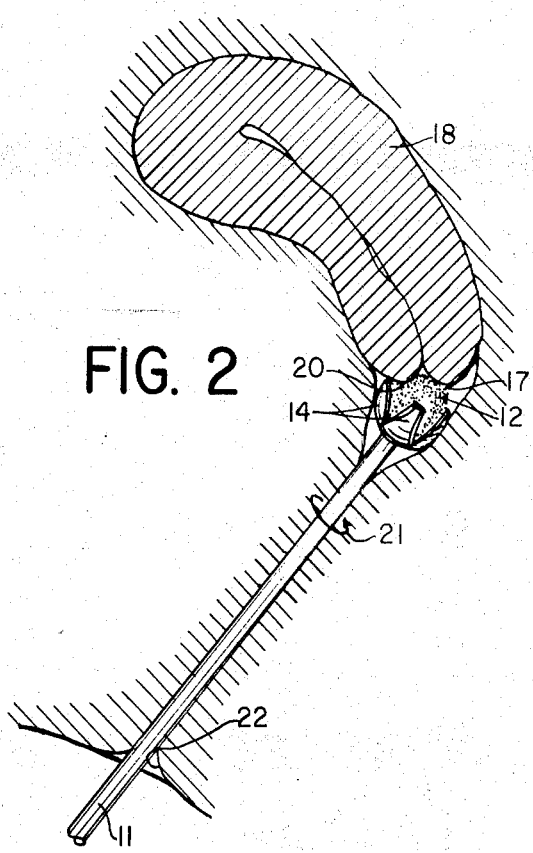
FIG. 2 is the same view as shown in FIG. 1 with the insertion tube withdrawn, and with the collector head in position for receiving a sample.

As can be seen in FIG. 1, unit 10 includes an insertion tube or cylinder 24 for facilitating the insertion of the collector head 12 into and through the vagina wall 22, in order to present the collector head 12 to the cervix 20. The tube or cylinder 24 serves to facilitate such insertion, simultaneously with protecting the collector head 12 and its petal-like protective cover 14 against disturbance until such time as the head 12 is placed in its appropriate test collecting position.

Figure 3:
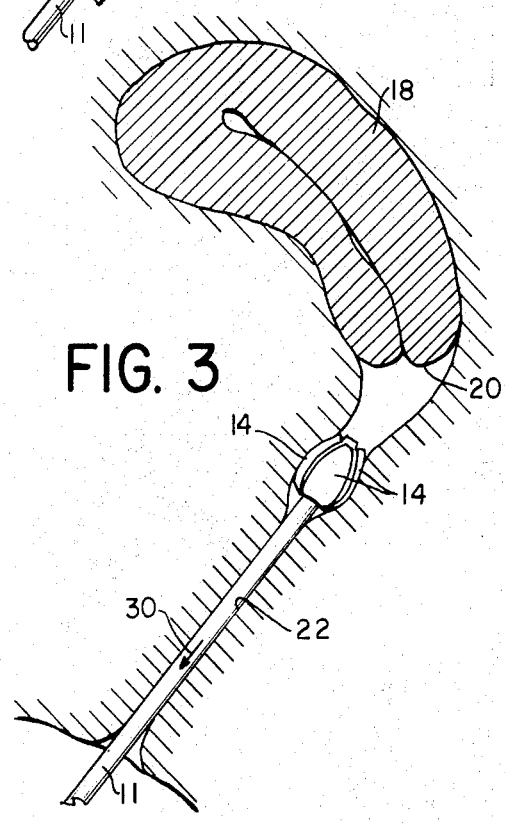
FIG. 3 is the same view as in FIGS. 1 and 2 and showing the new cervical scraper during withdrawal.

The dimensions of cylinder 24 will be such that insertion is readily obtained without undue force or pressure, with the only limitation being that the internal cross section be of a size to accommodate the size of head 12 noted above with its associated appendages 14 in closed overlapping position, as shown in FIG. 1. The length of cylinder 24 will be shorter than rod 11 to accommodate withdrawal thereof after head 12 reaches the position shown in FIG. 2. Thereafter, the insertion tube 24 is withdrawn and rod 11 is rotated or twirled as indicated by the arrow 21 in FIG. 2. This action, combined with the moist environment serves to open the petals 14 and expose the collector head to the cervix 20 of uterus 18. After appropriate collection of a sample, the rod 11 is withdrawn, as indicated by the arrow 30 in FIG. 3. This withdrawing action serves to close the flexible petal-like appendages 14 around the collector head 12, and protects it from exposure to contaminates along the wall 22 of the vagina, as indicated in FIG. 3.

It has been determined that a full cytological representation 28 (FIG. 4) of the cervical site, including endocervical cells, exocervical cells, and exudate, is obtained and readily transferred to a glass slide 26 by the person who has initially tested herself, in accordance herewith, for subsequent microscopic examination.

The head 12 is cut out or machined from a block of plastic foam to expose a myriad of scraping surfaces and collection pores at the peripheral surfaces. A flexible polyurethane foam, which is inert to epithelial tissue and has a density of approximately 2 lbs. per cubic inch and contains approximately 10–300 pores per lineal inch, has been found especially suitable, in accordance herewith.

Figure 4:
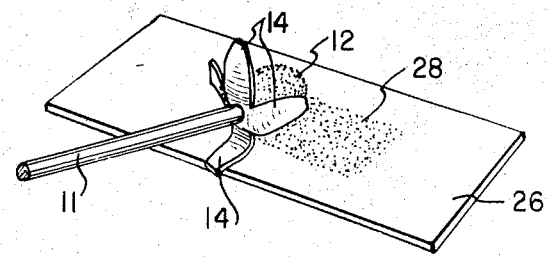
FIG. 4 is a perspective view of the new scraper during transfer of the collected specimen to a microscope slide.

This invention provides for a Pap smear having a full cytological representation of the cervical site, by insertion of the unit 10 into the vaginal canal until head 12 is flexibly collapsed against the cervix 20, with the petals 14 in their opened position (FIG. 2), until the scraper is flexibly collapsed against the cervix 20 at the entrance of the uterus 18. Thereafter, a simple 360° rotation of rod 11 and the withdrawal of scraper head 12 from the cervix, will collect by scraping and suction, a fully representative cytological sample. Sample 28 will include exocervical cells which are squamous cells, i.e., flat, square cells, the examination of which is necessary for the diagnosis of epidermoid carcinoma; endocervical cells which are columnar in shape, the examination of which is necessary for the diagnosis of adeno carcinoma; and exudate. Since the exudate, as noted above, might contain infectious microorganisms such as trichomonads, monilia albicans, leptothrix and numerous bacterial organisms, a broad spectrum diagnosis is achieved. Furthermore, sample 28 is simply and safely transferred to slide 26 without destruction of the friable cells comprising the sample, merely by rolling head 12 against slide 26, as shown in FIG. 4.

As will be understood, the new instrument 10 collects quantitatively and qualitatively, a better representation of the cervical site than has heretofore been collectable by prior art devices. Moreover, the collected specimen is not damaged in transfer to the slide and is less likely to be particularly bloody, since the new instrument does not cause the traumas at the testing site so often caused by the rigid-type scrapers of the prior art. In this connection, it should be noted that head 12 of the device, in accordance herewith, may be laterally flexed or tilted relative to the axis of rod 11 without having to reorient the rod.

Accordingly, and as will be apparent from the foregoing, the ease with which the new scraper, in accordance herewith, may be used by the patient herself, contributes to the improved quality of the finished Pap smear slide and hence, increases the reliability and accuracy of the diagnosis made from the slide. Moreover, this is achieved without undue discomfort by the patient herself, even in remote areas not having ready access to medical facilities, or alternatively, provides a procedure whereby a woman will more readily secure diagnosis of cervical smears since the test specimen may be obtained in the privacy of her own home. This in turn, encourages a much larger percentage of the general population to maintain a continuous periodic testing program in order to reduce the incidence of undetected cervical carcinoma, as well as other infections which might be present and not realized.

While the methods and constructions herein described constitute a preferred embodiment of the invention, it is to be understood that the invention is not limited to this precise construction and form, and that changes may be made therein without departing from the scope of the invention which is defined in the appended claims.

What is claimed is:

1. In a cervical scraper adapted for the self-imposed obtaining of a full representation of cells from a cervix and for safely transferring the cells to a microscopic slide; and having an elongated substantially rigid supporting rod with a substantially conical scraper head of flexible, soft, absorbent resilient material disposed on one end thereof; the combination which comprises a covering of a plurality of flexible petal-like appendages fixed at one of their ends and attached on said scraper adjacent the junction between said supporting rod and said scraper head; said appendages being disposed in an overlapping configuration around said scraper head for flexing from a closed position covering said head to an open position exposing said head to a cervix for obtaining a sample thereof and hollow insertion means enclosing said head and appendages for introduction of the scraper into the vaginal canal.

2. The scraper as recited in claim 1, in which said scraper head is comprised of polyurethane foam.

3. The scraper as recited in claim 1, in which said plurality of appendages are comprised of a member selected from the group consisting of natural rubbers, synthetic rubbers, polyethylene, polypropylene, polyester, latex impregnated paper, polyvinyl chloride, and mixtures thereof.

4. The scraper as recited in claim 1, in which said insertion means comprises a hollow insertion cylinder, the internal cross section of said cylinder being large enough to accommodate the movement of said scraper head therethrough while said plurality of appendages are in their closed overlapping position covering said head.

* * * * *